United States Patent
Yang et al.

(10) Patent No.: US 12,054,109 B2
(45) Date of Patent: Aug. 6, 2024

(54) VEHICLE

(71) Applicant: BYD COMPANY LIMITED, Guangdong (CN)

(72) Inventors: Zuhuang Yang, Shenzhen (CN); Xinhua Zhang, Shenzhen (CN); Junming Bai, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 659 days.

(21) Appl. No.: 17/273,616

(22) PCT Filed: Aug. 27, 2019

(86) PCT No.: PCT/CN2019/102822
§ 371 (c)(1),
(2) Date: Mar. 4, 2021

(87) PCT Pub. No.: WO2020/048353
PCT Pub. Date: Mar. 12, 2020

(65) Prior Publication Data
US 2021/0362664 A1  Nov. 25, 2021

(30) Foreign Application Priority Data

Sep. 4, 2018  (CN) .......................... 201811026906.5
Dec. 28, 2018  (CN) .......................... 201822240564.9

(51) Int. Cl.
*B60R 16/02* (2006.01)
*B60R 11/02* (2006.01)
(Continued)

(52) U.S. Cl.
CPC ...... *B60R 16/0231* (2013.01); *B60R 11/0217* (2013.01); *B60R 11/0229* (2013.01);
(Continued)

(58) Field of Classification Search
CPC ......... G05D 2201/0213; G05D 1/0251; G05D 1/0088; B60R 2300/105; B60R 1/20; B60R 1/24; B60R 1/25
See application file for complete search history.

(56) References Cited

U.S. PATENT DOCUMENTS 8,694,328 B1 * 4/2014 Gormley ............ G06Q 30/0621
705/26.7
9,467,515 B1 * 10/2016 Penilla .................. G06F 3/0484
(Continued)

FOREIGN PATENT DOCUMENTS

CN  102209111 A  10/2011
CN  102567612 A  7/2012
(Continued)

OTHER PUBLICATIONS

International Search Report of PCT/CN2019/102822 dated Oct. 29, 2019 (5 pages).

*Primary Examiner* — Steven B Theriault
(74) *Attorney, Agent, or Firm* — Calfee, Halter & Griswold LLP

(57) ABSTRACT

A vehicle including an intelligent driving control module is provided. The intelligent driving control module is connected to each system in the vehicle through a security gateway of the vehicle, and the intelligent driving control module has an open application programming interface (API). The open API is a data interface for a third-party developer to perform secondary development. After the third-party developer performs secondary development on the vehicle by using the open API, the intelligent driving control module obtains state data of the vehicle through the security gateway and intelligently controls the vehicle according to the state data.

20 Claims, 9 Drawing Sheets

(51) Int. Cl.
*B60R 11/04* (2006.01)
*B60R 16/023* (2006.01)
*B60R 16/033* (2006.01)
*G01S 13/931* (2020.01)
*B60R 11/00* (2006.01)

(52) U.S. Cl.
CPC ............ *B60R 11/04* (2013.01); *B60R 16/033* (2013.01); *G01S 13/931* (2013.01); *B60R 2011/0005* (2013.01); *B60R 2011/0026* (2013.01); *B60R 2011/0028* (2013.01); *B60R 2011/0033* (2013.01); *G01S 2013/93271* (2020.01); *G01S 2013/93272* (2020.01); *G01S 2013/93275* (2020.01)

(56) References Cited

U.S. PATENT DOCUMENTS

| | | | |
|---|---|---|---|
| 9,744,975 B1 | 8/2017 | Drako et al. | |
| 9,904,527 B1* | 2/2018 | Miller | G06F 8/71 |
| 10,146,521 B2* | 12/2018 | West | G06F 8/65 |
| 11,019,298 B2* | 5/2021 | Galluzzi | H04N 7/181 |
| 2002/0161820 A1* | 10/2002 | Pellegrino | H04L 67/10 |
| | | | 709/201 |
| 2013/0211628 A1* | 8/2013 | Thurow | G01F 1/666 |
| | | | 701/2 |
| 2013/0317668 A1* | 11/2013 | Tarnutzer | G06F 13/38 |
| | | | 701/2 |
| 2014/0213238 A1* | 7/2014 | Giraud | G07C 5/008 |
| | | | 455/418 |
| 2015/0008057 A1* | 1/2015 | Lo | B60L 50/15 |
| | | | 180/65.23 |
| 2015/0057894 A1* | 2/2015 | Jung | H04L 12/40032 |
| | | | 701/49 |
| 2015/0142253 A1* | 5/2015 | Nolting | G06Q 10/20 |
| | | | 701/29.6 |
| 2015/0210287 A1* | 7/2015 | Penilla | B60W 40/08 |
| | | | 701/49 |
| 2015/0331422 A1* | 11/2015 | Hartung | G05D 1/02 |
| | | | 701/23 |
| 2015/0358387 A1* | 12/2015 | Smereka | H04L 67/025 |
| | | | 715/740 |
| 2016/0070559 A1* | 3/2016 | West | G06F 8/65 |
| | | | 717/172 |
| 2016/0072643 A1 | 3/2016 | Fisher et al. | |
| 2016/0196731 A1* | 7/2016 | Aich | G08B 25/08 |
| | | | 340/539.17 |
| 2016/0197783 A1* | 7/2016 | Hort | H04L 41/0889 |
| | | | 709/222 |
| 2016/0246296 A1* | 8/2016 | Gelinske | H04W 4/70 |
| 2017/0043731 A1* | 2/2017 | Kim | H04L 67/12 |
| 2017/0262301 A1* | 9/2017 | Bai | G06F 9/4411 |
| 2017/0264691 A1* | 9/2017 | Bai | H04L 67/01 |
| 2017/0366017 A1* | 12/2017 | Clay | H02J 7/1423 |
| 2018/0022301 A1* | 1/2018 | Li | H02J 3/14 |
| | | | 307/9.1 |
| 2018/0026945 A1 | 1/2018 | Shulkin et al. | |
| 2018/0113210 A1 | 4/2018 | Izadian | |
| 2018/0126861 A1* | 5/2018 | Dörndorfer | B60L 53/34 |
| 2018/0150083 A1 | 5/2018 | Izadian | |
| 2018/0189917 A1* | 7/2018 | Shen | G06Q 50/30 |
| 2018/0281598 A1* | 10/2018 | Shu | G05B 19/042 |
| 2018/0357561 A1* | 12/2018 | Selvarajan | H04L 12/66 |
| 2019/0018669 A1* | 1/2019 | Cook | G06F 16/2365 |
| 2019/0066404 A1* | 2/2019 | Badri | G07C 5/08 |
| 2019/0110174 A1* | 4/2019 | Way | H04W 76/10 |
| 2019/0210544 A1* | 7/2019 | Gowda | B60R 16/0231 |
| 2019/0212725 A1* | 7/2019 | Woodrow | G05D 1/0293 |
| 2019/0222986 A1* | 7/2019 | Aitken | H04W 12/06 |
| 2019/0230206 A1* | 7/2019 | Halash | H04W 8/24 |
| 2019/0238638 A1* | 8/2019 | Way | G05D 1/0027 |
| 2019/0354091 A1* | 11/2019 | Das | G06N 5/02 |
| 2019/0370815 A1* | 12/2019 | Karthikeyan | G06Q 10/20 |
| 2020/0033847 A1* | 1/2020 | Way | G05D 1/0027 |
| 2020/0043063 A1* | 2/2020 | London | G05D 1/0088 |
| 2020/0241869 A1* | 7/2020 | Niemiec | H04W 12/106 |
| 2020/0259655 A1* | 8/2020 | Woo | H04W 4/44 |
| 2021/0258842 A1* | 8/2021 | Fiorese | H04W 36/36 |

FOREIGN PATENT DOCUMENTS

| | | |
|---|---|---|
| CN | 102833250 A | 12/2012 |
| CN | 104657300 A | 5/2015 |
| CN | 105620391 A | 6/2016 |
| CN | 106850799 A | 6/2017 |
| CN | 107650832 A | 2/2018 |
| CN | 108445885 A | 8/2018 |
| CN | 209249837 U | 8/2019 |
| EP | 3179401 A1 | 6/2017 |

* cited by examiner

VEHICLE

CROSS-REFERENCE TO RELATED APPLICATIONS

This application is the National Phase of International Application No. PCT/CN2019/102822, filed on Aug. 27, 2019, which is proposed based on and claims priority to Chinese Patent Applications No. 201811026906.5 and 201822240564.9, filed on Sep. 4, 2018 and Dec. 28, 2018, which are incorporated herein by reference in their entireties.

FIELD

This application relates to the field of electronic technologies, and in particular, to a vehicle.

BACKGROUND

With the improvement of people's living standards, as travel tools, vehicles, for example, cars have been gradually spread to people's life and work. However, functions of existing vehicles are fixed after leaving the factory, and an owner of a vehicle cannot perform secondary development on functions of the vehicle.

Therefore, it is necessary to provide a technical solution to resolve the foregoing technical problem.

SUMMARY

An objective of this application is to provide a vehicle, which includes an open application programming interface (API), to help a developer to perform secondary development on the vehicle without developing a bottom layer again in a development process.

This application is implemented in this way, a vehicle is provided, where the vehicle includes an intelligent driving control module, the intelligent driving control module is connected to each system in the vehicle through a security gateway of the vehicle, the intelligent driving control module includes an open API, and the open API is a data interface for a third-party developer to perform secondary development; and After the third-party developer performs secondary development on the vehicle by using the open API, the intelligent driving control module obtains state data of the vehicle through the security gateway and intelligently controls the vehicle according to the state data.

In this application, by disposing an intelligent driving control module including an open API in a vehicle, the open API is a data interface for a third-party developer to perform secondary development, and the intelligent driving control module is connected to the each system in the vehicle through a security gateway of the vehicle, so that after the third-party developer performs secondary development on the vehicle by using the open API, the intelligent driving control module obtains state data of the vehicle through the security gateway and intelligently controls the vehicle according to the state data. Further, the vehicle provided in this application is provided with the open API, which helps a developer to perform secondary development on the vehicle without developing the bottom layer again in the development process.

DETAILED DESCRIPTION

To make the objectives, technical solutions, and advantages of this application clearer, the following further describes this application in detail with reference to the accompanying drawings and the embodiments. It should be understood that the specific embodiments described herein are merely used to explain this application but are not intended to limit this application.

The following describes implementations of this application in detail with reference to specific accompanying drawings.

Figure 1:
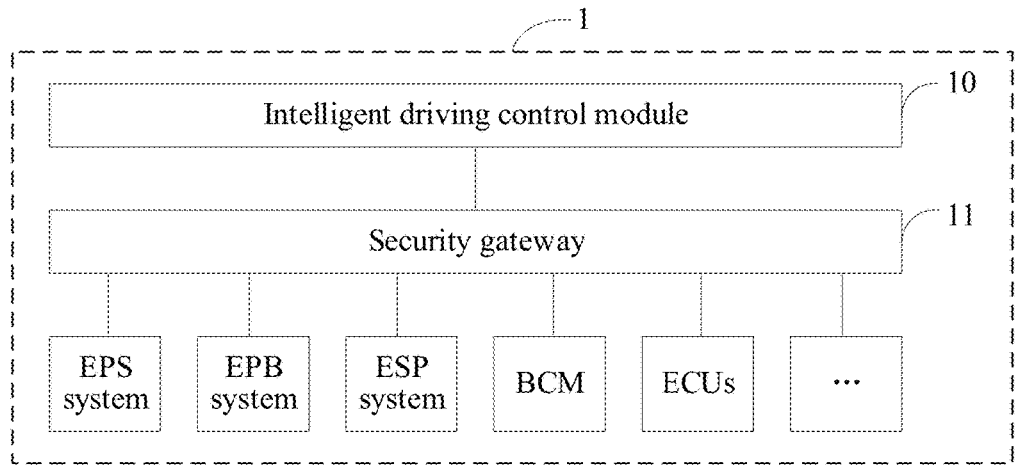
FIG. 1 is a schematic diagram of a module structure of a vehicle according to an embodiment of this application.

FIG. 1 shows a module structure of a vehicle provided in an embodiment of this application. For ease of description, only a part that is related to this embodiment is shown, and detailed description is as follows:

As shown in FIG. 1, a vehicle 1 provided in this embodiment of this application includes an intelligent driving control module 10. The intelligent driving control module 10 is connected to systems in the vehicle through a security gateway 11 of the vehicle 1, such as an electric power steering (EPS) system, an electric parking brake (EPB) system, an electronic stability program (ESP) system, a body control module (BCM), a motor controller, a gear controller, a combined switch module, and the like for the vehicle 1. It should be noted that, in this embodiment of this application, the each system described herein not only includes the foregoing systems, but also may include electronic control units (ECUs), sensors, a dashboard, multimedia, a loudspeaker, and the like in the vehicle.

Further, the intelligent driving control module 10 is provided with an open application programming interface (API), the API is a data interface for a third-party developer to perform secondary development on the vehicle, where the secondary development on the vehicle includes, but is not limited to, intelligent control of the entire vehicle and personalized display of the dashboard and the multimedia.

Specifically, after the third-party developer performs secondary development on the vehicle by using the open API, the intelligent driving control module 10 obtains state data of the vehicle through the security gateway 11 and intelligently controls the vehicle according to the state data.

During a specific implementation, the intelligent driving control module 10 is an independent control apparatus or controller, and may be implemented by an independent processor with a data programming capability, such as a field-programmable gate array (FPGA) processor. In addition, the intelligent driving control module 10 may be predisposed on the vehicle by a vehicle manufacturer before the vehicle leaves a factory, or may be added by the third-party developer after the vehicle leaves the factory, and a corresponding API protocol is provided by third-party main engine plants.

In addition, the intelligent driving control module 10 for the vehicle 1 in this application may be independently disposed anywhere of the vehicle. Since a trunk has an environment with right temperature, good electromagnetic, and convenient spatial arrangement, the intelligent driving control module 10 in this embodiment of this application is preferably disposed in the trunk of the vehicle.

In addition, when the intelligent driving control module 10 performs intelligent control over the entire vehicle according to the state data of the vehicle, the intelligent driving control module first generates corresponding vehicle control instructions according to the state data of the vehicle, and further controls modules of the vehicle 1 according to the vehicle control instructions, to implement the intelligent control over the vehicle 1.

It should be noted that, in this embodiment of this application, the state data of the vehicle is data obtained from devices such as various power systems and sensors of the vehicle when the vehicle is in a driving or static process, such as data obtained from a door lock, an engine, tyres, a seat belt detector, a car light controller, a gearbox, a brake, various ECUs, and each system when the vehicle is in a driving process. The state data of the vehicle includes, but is not limited to, vehicle state signals fed back from the ESP system, vehicle state signals fed back from the EPS system, vehicle state signals fed back from an entire vehicle controller, gear feedback signals, signals fed back from a light and wipers, and vehicle state signals fed back by the EPB system.

Specifically, the vehicle state signals fed back from the ESP system include state signals such as a vehicle speed, a vehicle speed state (used for determining whether a vehicle speed value is valid, that is, whether the vehicle speed value is valid or invalid), a wheel speed and a wheel speed state, a steering angle and a steering angle state, a steering angle offset, a longitudinal acceleration and an offset state, a lateral acceleration and an offset state, a traction force fault state, a body dynamic fault state, a wheel speed pulse and wheel speed pulse validity, auto brake available and enabled states, a brake light control command and a request state, a wheel driving direction and a wheel driving direction state, an auto parking state, VLC available and enabled states, a VLC error state, a torque request value and state, and CDD available, enabled, and error states. The vehicle state signals fed back by the EPS system include state signals such as an angle and an angle state, and current driving mode feedback. The vehicle state signals fed back by the entire vehicle controller include an accelerator depth and an accelerator significant digit, a brake depth and a brake significant digit, a target gear state, a motor torque and a state thereof, an entire vehicle actual feedback torque and a state thereof, a motor speed and a state thereof, overdriving, and driving mode feedback. The gear feedback signals include a gear and a state thereof, and driving mode feedback. The vehicle state signals fed back by the EPB include state signals such as an EPB state and a significant digit thereof, and driving mode feedback.

Further, in this embodiment of this application, the vehicle control instructions include, but are not limited to, lateral control instructions, longitudinal control instructions, and light and wiper control instructions. The lateral control instructions include an angle, an angular speed, an EPS driving mode, and a lateral emergency exiting from an intelligent driving mode. The longitudinal control instructions include a comfortable braking target acceleration, an acceleration upper limit error, an acceleration lower limit error, a maximum permissible target acceleration, a minimum permissible target acceleration, a startup request, a stop request, a prebrake request, an ESP driving mode, an emergency braking target acceleration, and an emergency braking state. The light and wiper control instructions include control instructions controlling devices such as a left turn indicator, a right turn indicator, a brake light, a double-flash light, a low beam headlight, a high beam headlight, a small light, a front fog light, and wipers.

In this embodiment, external programs may be applied to the system of the vehicle and use the system resources without changing source code of the system through the open API on the intelligent driving control module 10, which is provided in this embodiment of this application. So it helps the third-party developer to perform intelligent control over devices such as the multimedia, the dashboard, the loudspeaker, and the ECUs in the vehicle based on the existing open API, and helps the developer to perform secondary development on the vehicle through the open API. In this way, the cost of secondary development is low and the secondary development is easy to implement.

In addition, by disposing the open API on the intelligent driving control module 10 of the vehicle, when the user upgrades the vehicle, because of the same definition of the API, even a bottom layer protocol of the vehicle changes, the vehicle is still compatible with the API; or when the user changes the vehicle, no matter how the bottom layer protocol of the vehicle changes, the vehicle may achieve upgrade and compatibility as long as the program and application developed by the third party are still compatible, which helps function transfer of the program developed by the third party.

Figure 2:
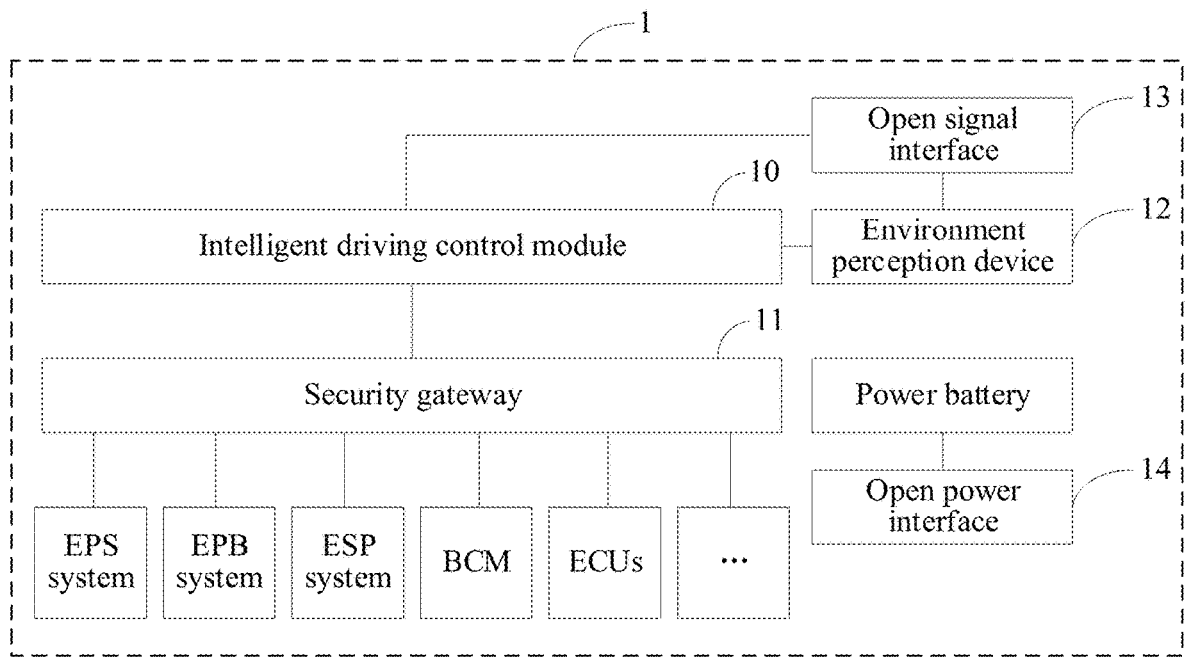
FIG. 2 is a schematic diagram of a module structure of a vehicle according to another embodiment of this application.

Further, as an exemplary implementation of this application, an installation structure is further reserved on the vehicle, and the installation structure is configured to install an environment perception device 12 (as shown in FIG. 2). The environment perception device 12 is connected to the intelligent driving control module 10. The environment perception device 12 is configured to obtain an external environmental state of the vehicle and send the external environmental state of the vehicle to the intelligent driving control module 10, so the intelligent driving control module 10 control the vehicle according to the external environmental state and the state data of the vehicle. It should be noted that, in this embodiment of this application, the installation structure reserved on the vehicle includes, but is not limited to, an installation hole and an installation bolt. A specific position of the reserved installation structure is to be described in detail below, and details are not described herein again.

The external environmental state of the vehicle obtained by the environment perception device 12 refers to an environmental state outside the vehicle perceived by the environment perception device 12. The environmental state includes, but is not limited to pedestrian conditions and surrounding environmental state that are outside the vehicle.

In this embodiment, it is convenient to fix various environment perception devices 12 to the vehicle body with the installation structure reserved on the vehicle. In this way, there is no need to perform large-scale processing and modification on the structure of the vehicle while installing the various environment perception devices 12, thereby helping the user to use while saving the cost.

Further, as an exemplary implementation of this application, as shown in FIG. 2, the vehicle 1 is further provided with an open signal interface 13. The open signal interface 13 is connected to the intelligent driving control module 10 and the environment perception device 12 to implement communication between the environment perception device 12 and the intelligent driving control module 10.

Figure 6:
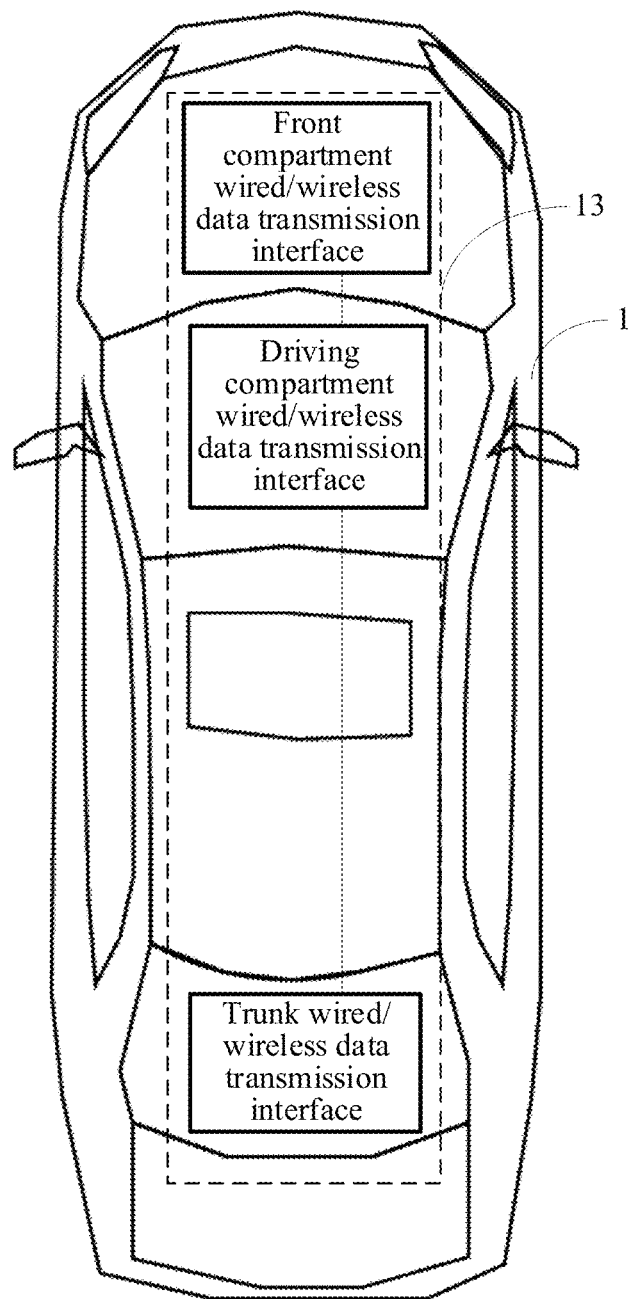
FIG. 6 is a schematic diagram of setting positions of open signal interfaces in a vehicle on the vehicle according to an embodiment of this application.

In this embodiment of this application, during a specific implementation, for setting positions of the open signal interfaces 13 on the vehicle, reference may be made to FIG. 6. As shown in FIG. 6, the open signal interfaces 13 disposed on the vehicle 1 shown in this embodiment of this application are exemplarily disposed at a front compartment position, a driving compartment position, and a trunk position of the vehicle 1, and the signal interfaces disposed at the front compartment position, the driving compartment position, and the trunk position are interlinked. In addition, the open signal interface 13 disposed on the vehicle 1 provided in this embodiment of this application may be a wired signal interface or may be a wireless signal interface, which is not limited herein.

In this embodiment, communication connection between the intelligent driving control module 10 and the environment perception device 12 is completed by disposing the open signal interface 13 on the vehicle 1 when the environment perception device 12 is added to the vehicle 1. In this way, a signal interface is provided for the secondary development of the vehicle 1, thereby helping the developer to perform secondary development on the vehicle.

Figure 3:
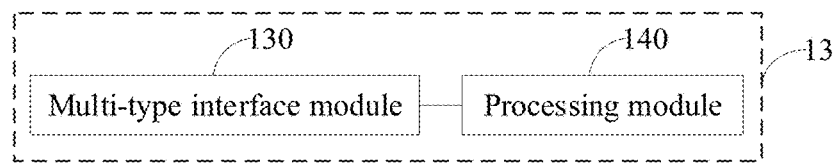
FIG. 3 is a schematic diagram of a module structure of an open signal interface according to an embodiment of this application.

Specifically, as shown in FIG. 3, the open signal interface 13 provided in this embodiment of this application includes a multi-type interface module 130 and a processing module 140.

A data end of the multi-type interface module 130 is connected to a data end of the processing module 140, and the multi-type interface module 130 is connected to an external device (including but not limited to the environment perception device) with a plurality of interface types, and the processing module 140 obtains data collected by the external device with a plurality of interface types through the multi-type interface module 130 and processes the data.

During a specific implementation, the multi-type interface module 130 includes, but is not limited to, a secure digital (SD) card card slot, a universal serial bus (USB) interface, a type-c interface, a network interface, a DB9 interface, and a high-definition multimedia interface (HDMI).

In this embodiment, by providing the open signal interface 13 including the multi-type interface module 130, the open signal interface 13 may be connected to a plurality of external devices with different types of interfaces, which meets a requirement of the user for accessing a plurality of types of interfaces, and resolving a problem that the user requirement cannot be met since an existing open signal interface has only one interface.

Furthermore, in an implementation of this application, the open signal interface 13 provided in this application further includes a voltage conversion module. A voltage end of the voltage conversion module is connected to a voltage end of the multi-type interface module 130 and a voltage end of the processing module. The voltage conversion module receives a direct current (DC) and supply power to the multi-type interface module 130 and the processing module 140 by using the DC.

Figure 4:
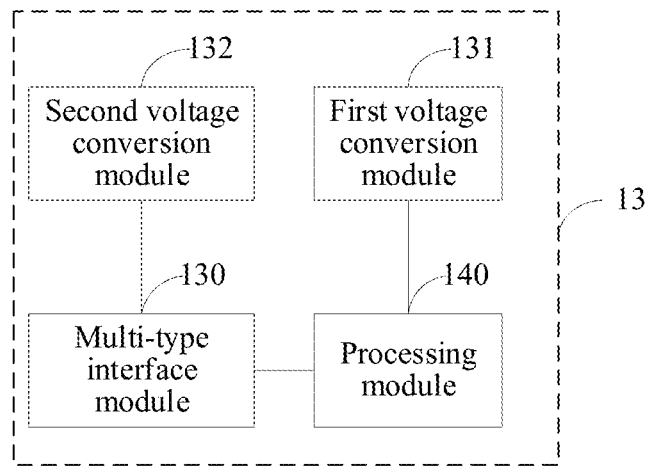
FIG. 4 is a schematic diagram of a module structure of an open signal interface according to another embodiment of this application.

Further, in an implementation of this application, as shown in FIG. 4, the voltage conversion module includes a first voltage conversion module 131 and a second voltage conversion module 132. A voltage input end of the first voltage conversion module 131 and a voltage input end of the second voltage conversion module 132 receive the DC provided by a power supply device, a voltage output end of the first voltage conversion module 131 is connected to the voltage end of the processing module 140, and a voltage output end of the second voltage conversion module 132 is connected to the voltage end of the multi-type interface module 130.

Specifically, the first voltage conversion module 131 supplies power to the processing module 140 through the DC received from the power supply device, which means that, after receiving the DC provided by the power supply device, the first voltage conversion module 131 supplies power to the processing module 140 after converting the DC into a power supply voltage required by the processing module 140. The second voltage conversion module 132 supplies power to the multi-type interface module 130 through the DC means that, after receiving the DC provided by the power supply device, the second voltage conversion module 132 supplies power to the multi-type interface module 130 after converting the DC into a power supply voltage required by the multi-type interface module 130.

During a specific implementation, the first voltage conversion module 131 and the second voltage conversion module 132 may be implemented by using an existing DC-DC conversion circuit. In addition, in this embodiment, the processing module 140 may be implemented by using a processor including a data programming capability, such as a field-programmable gate array (FPGA) or an ARM processor.

Figure 5:
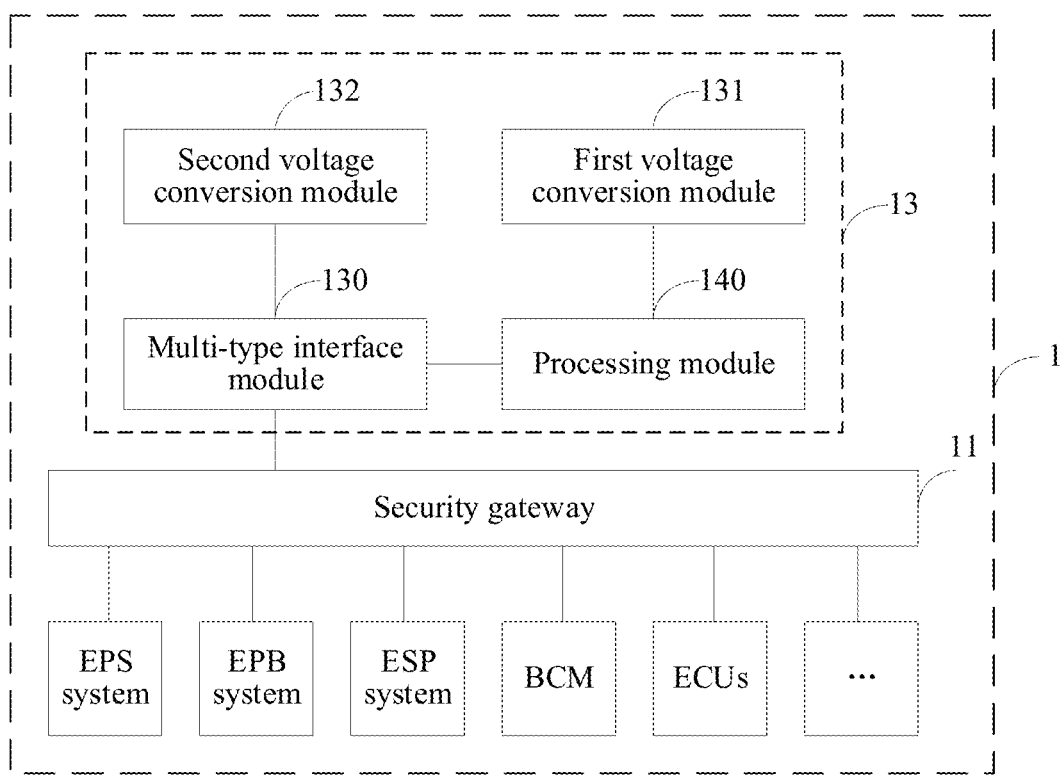
FIG. 5 is a schematic diagram of a module structure of a vehicle according to an embodiment of this application.

FIG. 5 shows a module structure of a vehicle provided in an embodiment of this application. For ease of description, only a part that is related to this embodiment is shown, and detailed description is as follows:

As shown in FIG. 5, the vehicle 1 provided in this embodiment of this application includes an open signal interface 13. A multi-type interface module 130 in the open signal interface 13 is connected to a security gateway 11 of the vehicle, and the security gateway 11 is connected to each system in the vehicle, such as an EPS system, an EPB system, an ESP system, a BCM system, a motor controller, a gear controller, and a combined switch module in the vehicle 1. It should be noted that, in the embodiments of this application, the each system described herein not only includes the foregoing systems, but also may further include ECUs, sensors, a dashboard, multimedia, and a loudspeaker in the vehicle.

Further, a processing module 140 of the open signal interface 13 obtains state data of the vehicle 1 through the multi-type interface module 130 of the open signal interface 13 and the security gateway 11 of the vehicle 1. That is, the state data of the vehicle 1 is sent to the multi-type interface module 130 of the open signal interface 13 through the security gateway 11 and then is further sent to the processing module 140 through the multi-type interface module 130. The processing module 140 processes the state data and data collected by an external device after obtaining the state data. It should be noted that, in this embodiment, data processing performed by the processing module 140 on the state data and the data collected by the external device is mainly time axis processing, that is, performing time synchronization processing on the state data and the data collected by the external device.

In this embodiment, by setting the open signal interface 13 on the vehicle, according to an advantage that the open signal interface 13 may be connected to an external device with a plurality of different interface types, vehicle function extension and external data interface development may be implemented. In addition, a requirement of the user for accessing a plurality of types of interfaces is met, and a problem that the user requirement cannot be met since an existing open signal interface 13 has only one interface is resolved. As can be known based on the related description of FIG. 1 and FIG. 2, no matter the reserved installation structure or the open signal interface 13 disposed on the vehicle 1, on the basis that the intelligent driving control module 10 includes an open API, the vehicle 1 provided in this embodiment of this application may not only intelligently drive, intelligently control a display interface the dashboard of the vehicle, and intelligently control the vehicle, but also help the user to perform secondary development. The following provides detailed examples for specific secondary development application for the vehicle 1 provided in this embodiment of this application:

First, refer to Table 1, it may be seen from Table 1 that, the vehicle 1 provided in this embodiment of this application may be applied to different scenarios. Taking a scenario of which a serial number is 1 as an example, the intelligent driving control module 10 in the vehicle 1 modifies a display interface and style of the dashboard according to fed back signals such as a vehicle speed, mileage, an electric quantity, and lights to make it possible for user to get a preferred style on the original vehicle. It should be noted that, all of the application scenarios shown in Table 1 are implemented by the intelligent driving control module 10 controlling related devices on the vehicle according to the state data of the vehicle. In this embodiment, only the scenario of which the serial number is 1 is described as an example, and the rest are not described herein again.

TABLE 1

Examples of secondary development application scenarios of the vehicle 1

| | | Vehicle: Application scenario 1 | | |
|---|---|---|---|---|
| Serial number | Developable function | Signals need to be obtained/controlled | Illustraton of specific scenarios | Classification |
| 1 | Personalized dashboard theme | Signals of a vehicle speed, mileage, an electric quantity, lights, and the like | Modify a display interface and style of a dashboard, and display user's preferred dashboard style on the original vehicle | Personalization |
| 2 | Music breathing lights | Atmosphere light control, loudspeaker, multimedia signals | Color and brightness of in-vehicle atmosphere lights change along with changes of the music | Personalization |
| 3 | Driving habits adaptation | Vehicle speed, accelerator, brake gear signals | Get user's preferred drive style by statistical analysis of the driving data, drive styles include comfortable, preference for sport or fierce | Personalization |
| 4 | Camera data sharing | Data of panoramic camera | Share current surrounding driving environment with family members and friends, remotely monitor, and post pictures and videos on social media | Personalization |
| 5 | Panorama auto parking | ultrasonic radar information and panoramic camera image; vehicle driving control | Functions of parking lot recognition and auto parking in which ultrasonic radars and cameras are combined | Vehicle control |
| 6 | Logistics vehicle | Data such as ultrasonic radar information, panoramic camera image, gear, vehicle speed, and mileage; vehicle driving control | Logistics center and intelligent driving on a high-speed road of the logistics center | Vehicle control |
| 7 | Intelligent taxi | Data such as ultrasonic radar information, panoramic camera image, gear, vehicle speed, and mileage; vehicle driving control | Intelligently pick-up passenger, carry passenger and reach the destination, in the city | Vehicle control |

As can be known from Table 1, Table 1 only describes secondary development application scenarios of the vehicle 1 provided in this embodiment of this application by using some specific examples, the secondary development scenarios of the vehicle 1 in this application are not merely as described in Table 1, and further description is made below by using Table 2:

TABLE 2

Examples of secondary development application scenarios of the vehicle 1

Vehicle: Application scenario 2

| Serial number | Open signal | Belonged system | Description of function points |
|---|---|---|---|
| 1 | Camera image signal | Driving recorder, panoramic image | 1. Defogging, monitoring, display optimization<br>2. Temporarily recalling image from monitoring around the vehicle |
| 2 | Backlight/ atmosphere light control signal | Light control system | 1. Lights changes with music<br>2. During singing, offer KTV light atmosphere |
| 3. | Air conditioner blower interface | Air conditioner system | Open the air conditioner blower interface, switch to output loop after implementing power off of the vehicle, drive the blower to rotate continuously through a solar battery, keep air circulation between inner and outer of the vehicle to prevent a temperature gap between the inside and the outside of the vehicle from getting too large |
| 4 | Open 4G and GPS position signal | Multimedia system | Control electrical appliances (air conditioners, curtains, and the like) at home to start after the vehicle returns to a cell parking lot |
| 5 | Open tyre pressure signal | Tyre pressure system | Display a phone number of nearby rescue company on the multimedia after detecting puncture |
| 6 | Maintenance reminder signal | Combined dashboard system | The sales company can know maintenance conditions of sold vehicles, and provide targeted after-sales visit and other services to improve after-sales service quality and efficiency |
| 7 | Taillight control signal, front camera information | Lights and cameras | Transmit morse code by controlling a flicker frequency and cycle of the taillight, to inform a rear vehicle of conditions of the front vehicle, such as that the brake is broken or the driver is kidnapped |
| 8 | Camera/wiper signal | Wiper control system | Customize auto wipers |
| 9 | Radio interface signal | Multimedia system | Customized auto channel selection and auto frequency adjustment according to a time period |
| 10 | Micromotion switch signal/in-vehicle 4G nterface/light control | Entire vehicle | Customized vehicle moving reminder request a vehicle owner to move the vehicle according to micromotion switch key signals with combination of 4G network. After the vehicle owner responds, lights are turned on to represent that a message has been received. Avoid leaving personal information such as phone number. |
| 11 | Rear radar control signal | Lane changing dead zone detection system | Implement an anti-tracking function |
| 12 | Millimeter wave radar signal | ACC system | Drivable regions displaying and reminding, anti-collision, oil consumption reduction |
| 13 | Ultrasonic radar signal | Auto parking system | Reminder displaying, anti-collision |
| 14 | Navigation signal | Multimedia | Reduce oil consumption according to topographic information, and share motorcade road information |
| 15 | Display screen interface signal | Multimedia dashboard | Customized UI interface |

TABLE 2-continued

Examples of secondary development application scenarios of the vehicle 1

Vehicle: Application scenario 2

| Serial number | Open signal | Belonged system | Description of function points |
|---|---|---|---|
| 16 | Seat adjustment interface signal, in-vehicle camera signal | Seat system | Recognize vehicle owner to implement auto seat adjustment |
| 17 | Air conditioner interface signal | Air conditioner system | Customized auto temperature adjustment |
| 18 | Camera/vehicle door control signal | Vehicle door control system | Select a door opening manner according to space |
| 19 | Steering wheel angle rotation/accelerator /brake paddle/display screen | Entire vehicle | Simulate driving learning/practicing (virtual simulation) |
| 20 | Door opening signal | Vehicle door control system | Open a double-flash light when a door opening signal is detected |
| 21 | Seat adjustment interface | Seat system | Seat information is saved in a mobile phone APP of a driver, so that the driver can adjust seat to be suitable by using the mobile phone APP every time the driver drives different vehicles. |
| 22 | Seat or steering wheel vibration interface | Seat system | When a mobile phone of a driver is in a vibration mode, reminder functions such as an alarm clock may give a prompt to the driver through vibration of the seat or the steering wheel. |
| 23 | Fuel tank oil quantity information interface/navigation system | Navigation system | Input a destination into a vehicle navigation system, detect the oil quantity before a route is generated, determine whether the oil is sufficient for reaching the destination, and remind the driver whether to adjust the route to a suitable service station. |
| 24 | Engine state signal, vehicle door state | Power system Vehicle body system | Automatically lock the vehicle when a vehicle locking signal is not detected within a certain time after a turn-off signal is detected |
| 25 | Wiper, vehicle window, sunroof state signal | Vehicle body system | A rainfall sensor detects rainfalls to automatically adjust the wipers, close the vehicle window and the sunroof. |
| 26 | Battery level signal | Battery control system | A user may customize a charging threshold and a charging stop upper limit value of a battery, to avoid over discharge or overcharge of the battery, and allow the user to actively participate in battery protection |
| 27 | Oil consumption signal | Engine system, entire vehicle electricity consumption condition | A user views proportions of power consumption of various systems in real time and analyzes oil consumption |
| 28 | Steering wheel angle rotation signal | Steering wheel system | A user may view an angle of the steering wheel or whether the steering wheel has been reset in real time by using peripherals such as a mobile phone or an IPAD, which is quite helpful to a new driver |
| 29 | Vehicle headlight signal | Light control system | Camera determines the environment and sends a signal to control headlights |
| 30 | Engine sound simulator | Multimedia system | Customize engine sound |
| 31 | Switch signal | Combined switch system | Add a customization function by using an original switch |

TABLE 2-continued

Examples of secondary development application scenarios of the vehicle 1

Vehicle: Application scenario 2

| Serial number | Open signal | Belonged system | Description of function points |
|---|---|---|---|
| 32 | Sunshade motor control signal | Vehicle body system | A sensor controls the sunshade to automatically adjust a brightness of the light by collecting state information of a driver |
| 33 | Power battery signal | Battery control system | send electric quantity of the power battery of the entire vehicle and position information of nearby charging piles to a vehicle owner, to remind the vehicle owner to charge nearby when the electric quantity is low |
| 34 | Speech control interface | Multimedia system | Order takeout through speech on a way home |
| 35 | Open in-vehicle vehicle camera and in-backlight control signal | Lights and cameras | Detect pupil information of a driver through in-vehicle cameras to adjust a brightness of the backlight |

As can be seen from Table 2, the vehicle 1 provided in this embodiment of this application may make it easy for the user to perform secondary development of different scenarios. Taking a scenario of which the serial number is 4 as an example, after the vehicle drives to the cell parking lot, a GPS apparatus in the vehicle obtains a position signal of the vehicle and sends the position signal to the intelligent driving control module 10 in the vehicle 1, and after receiving the control signal, the intelligent driving control module 10 controls corresponding electrical appliances at home to start. It should be noted that, although the application scenarios shown in Table 2 are scenarios of secondary development of the user, the application scenarios are scenarios in which the intelligent driving control module 10 controls corresponding devices on the vehicle according to a vehicle state or an external environmental state of the vehicle fed back by the vehicle. In this embodiment, only the scenario of which the serial number is 4 is described as an example, and the rest are not described herein again.

It should be noted that, Table 1 and Table 2 only give an illustration for extended application scenarios of usage of one single vehicle by the user, when customers are users of a batch of vehicles, such as a taxi company, car-sharing company, and large buses or vans company, for ease of vehicle use and management and renter of rental vehicles, secondary development of corresponding function requirements may be also performed on open interfaces of the vehicles, to meet requirements of different application customers for customizing and developing vehicles.

In this embodiment of this application, the vehicle 1 provided in this application may not only directly obtain vehicle signals and control the vehicle to drive, but also may be configured to develop secondary functions such as a dashboard or multimedia, to meet the requirement of personalization of the user.

Further, in an exemplary implementation of this application, as shown in FIG. 2, the vehicle 1 provided in this embodiment of this application is further provided with an open power interface 14. The open power interface 14 includes a 220 V power supply interface, a 24 V power supply interface, and a 12 V power supply interface. The 220 V power supply interface, the 24 V power supply interface, and the 12 V power supply interface are all connected to the power battery on the vehicle, to help a power supply circuit in the vehicle to supply power to the environment perception device 12 added to the vehicle or an existing corresponding apparatus on the vehicle through the 220 V power supply interface, the 24 V power supply interface, and the 12 V power supply interface, after converting electric energy provided by the power battery into a 220 V alternating current (AC), a 24 V DC, or a 12 V DC.

Figure 7:
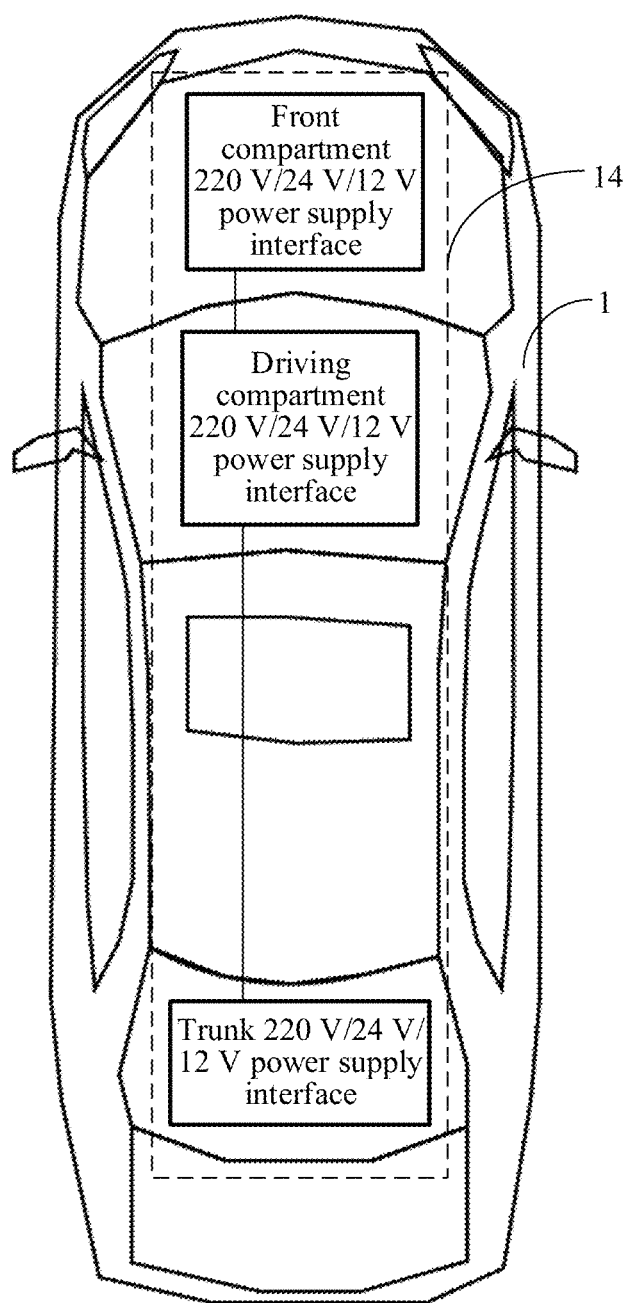
FIG. 7 is a schematic diagram of setting positions of open power interfaces in a vehicle on the vehicle according to an embodiment of this application.

In this embodiment of this application, during a specific implementation, for setting positions of the open power interfaces 14 on the vehicle, reference may be made to FIG. 7. As shown in FIG. 7, the open power interfaces 14 disposed on the vehicle 1 shown in this embodiment of this application are exemplarily disposed at a front compartment position, a driving compartment position, and a trunk position of the vehicle 1, and power interfaces disposed at the front compartment position, the driving compartment position, and the trunk position are interlinked.

In this embodiment, by disposing the open power interface 14 on the vehicle 1 provided in this embodiment of this application, the vehicle shown in this application may provide 220 V, 12 V, and 24 V power supply interfaces, which may reserve power supply interfaces for devices added to the front compartment, the driving compartment, the trunk or other positions of the vehicle. In addition, no need to add relevant power supply inversion device while the power supply interfaces of the vehicle are enriched, which reduces the cost and is easy to install.

Figure 8:
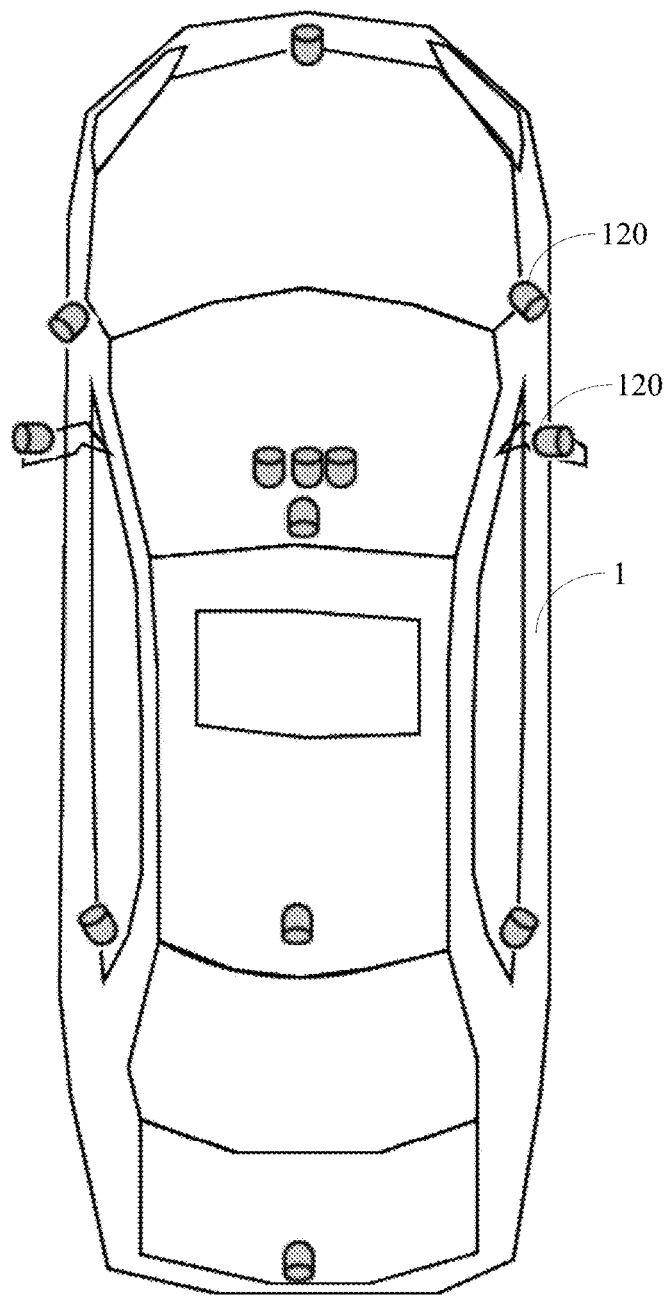
FIG. 8 is a schematic diagram of setting positions of a plurality of image collectors in a vehicle on the vehicle according to an embodiment of this application.

Further, in an exemplary implementation of this application, as shown in FIG. 8, the environment perception device 12 (not shown in the figure, refer to FIG. 2) installed to the vehicle 1 includes a plurality of image collectors 120. The plurality of image collectors 120 are respectively disposed on a front windshield, a left rear-view mirror, a right rear-view mirror, a top, a trunk lid, an inner wall of a passenger compartment (for example, a top inner wall of the passenger compartment) and a front grille of the vehicle 1, and are connected to the intelligent driving control module 10 (not shown in the figure, refer to FIG. 2) in a wired manner (for example, through a Can cable, a Lin cable, an Ethernet cable, a coaxial cable, and a MOST bus) or in a wireless manner (for example, Wi-Fi and Bluetooth).

During a specific implementation, the plurality of image collectors 120 may be implemented by using 13 cameras, and the cameras may be disposed on the vehicle body through installation holes, bolts or other manners. It should be noted that, in this embodiment of this application, if the cameras are disposed on the vehicle body through the installation holes, the bolts, or the other manners, corresponding installation structures are all reserved on relevant installation positions of the cameras on the vehicle body.

Figure 9:
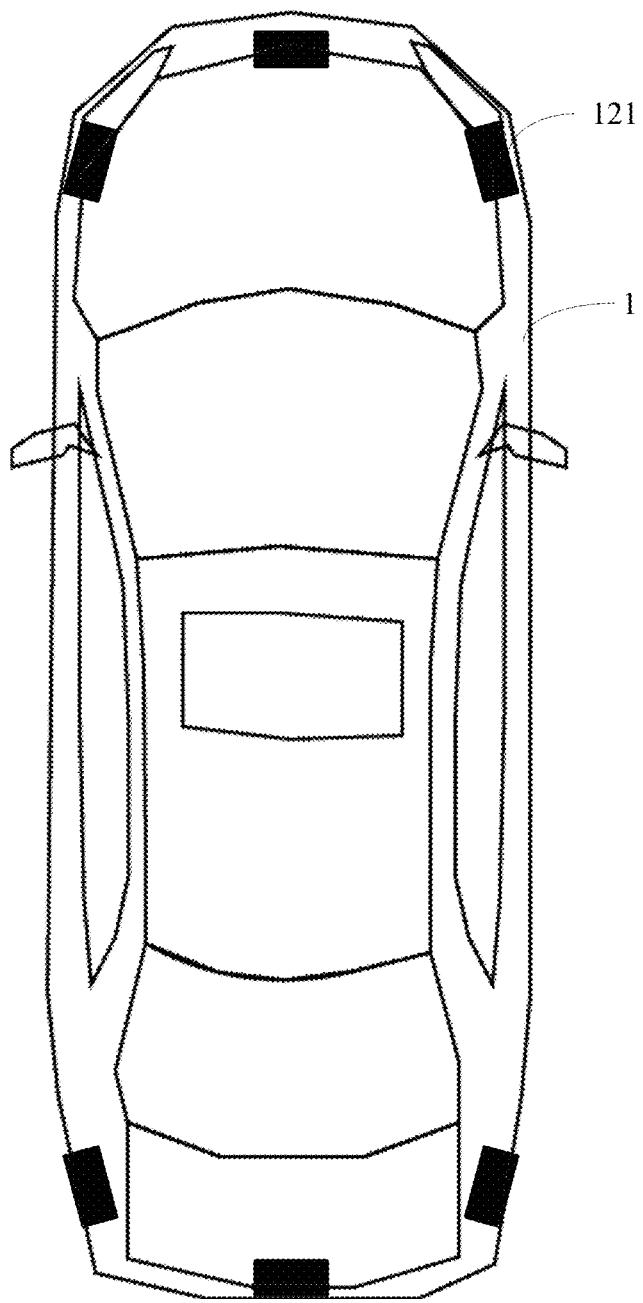
FIG. 9 is a schematic diagram of setting positions of a plurality of first radar devices in a vehicle on the vehicle according to an embodiment of this application.

Further, in an exemplary implementation of this application, as shown in FIG. 9, the environment perception device 12 (not shown in the figure, refer to FIG. 2) applied to the vehicle 1 includes a plurality of first radar devices 121. The plurality of first radar devices 121 are disposed on the front grille, a front anti-collision beam and a rear anti-collision beam of the vehicle 1, and are connected to the intelligent driving control module 10 (not shown in the figure, refer to FIG. 2) in a wired manner (for example, through a Can cable, a Lin cable, an Ethernet cable, a coaxial cable, and a MOST bus) or in a wireless manner (for example, Wi-Fi and Bluetooth).

During a specific implementation, the plurality of first radar devices 121 may be implemented by using 6 millimeter wave radars, and the millimeter wave radars may be disposed on the vehicle body through installation holes, bolts, or other manners. It should be noted that, in this embodiment of this application, if the millimeter wave radars are disposed on the vehicle body through the installation holes, the bolts, or the other manners, corresponding installation structures are all reserved on relevant installation positions of the millimeter wave radars on the vehicle body.

Figure 10:
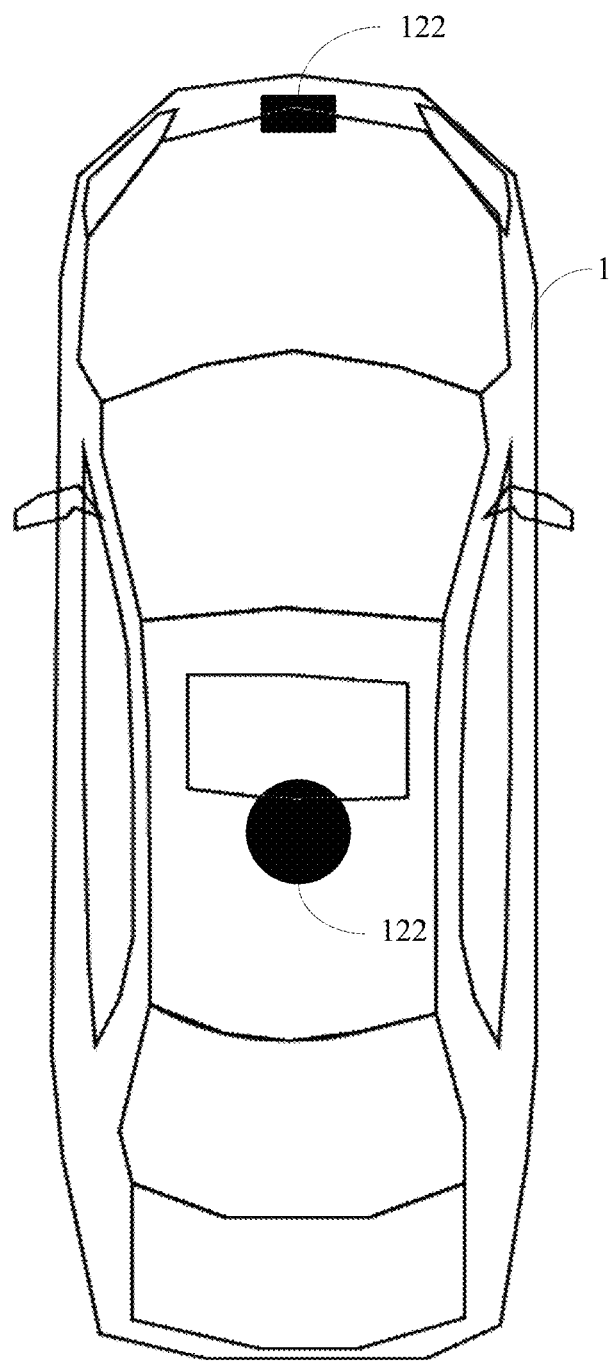
FIG. 10 is a schematic diagram of setting positions of a plurality of second radar devices in a vehicle on the vehicle according to an embodiment of this application.

Further, in an exemplary implementation of this application, as shown in FIG. 10, the environment perception device 12 (not shown in the figure, refer to FIG. 2) applied to the vehicle 1 includes a plurality of second radar devices 122. The plurality of second radar devices 122 are disposed on the front grille and the top of the vehicle 1, and are connected to the intelligent driving control module 10 (not shown in the figure, refer to FIG. 2) in a wired manner (for example, through a Can cable, a Lin cable, an Ethernet cable, a coaxial cable, and a MOST bus) or in a wireless manner (for example, Wi-Fi and Bluetooth).

During a specific implementation, the plurality of second radar devices 122 may be implemented by using 2 laser radars, and the laser radars may be disposed on the vehicle body through installation holes, bolts, or other manners. It should be noted that, in this embodiment of this application, if the laser radars are disposed on the vehicle body through the installation holes, the bolts, or the other manners, corresponding installation structures are all reserved on relevant installation positions of the laser radars on the vehicle body.

Figure 11:
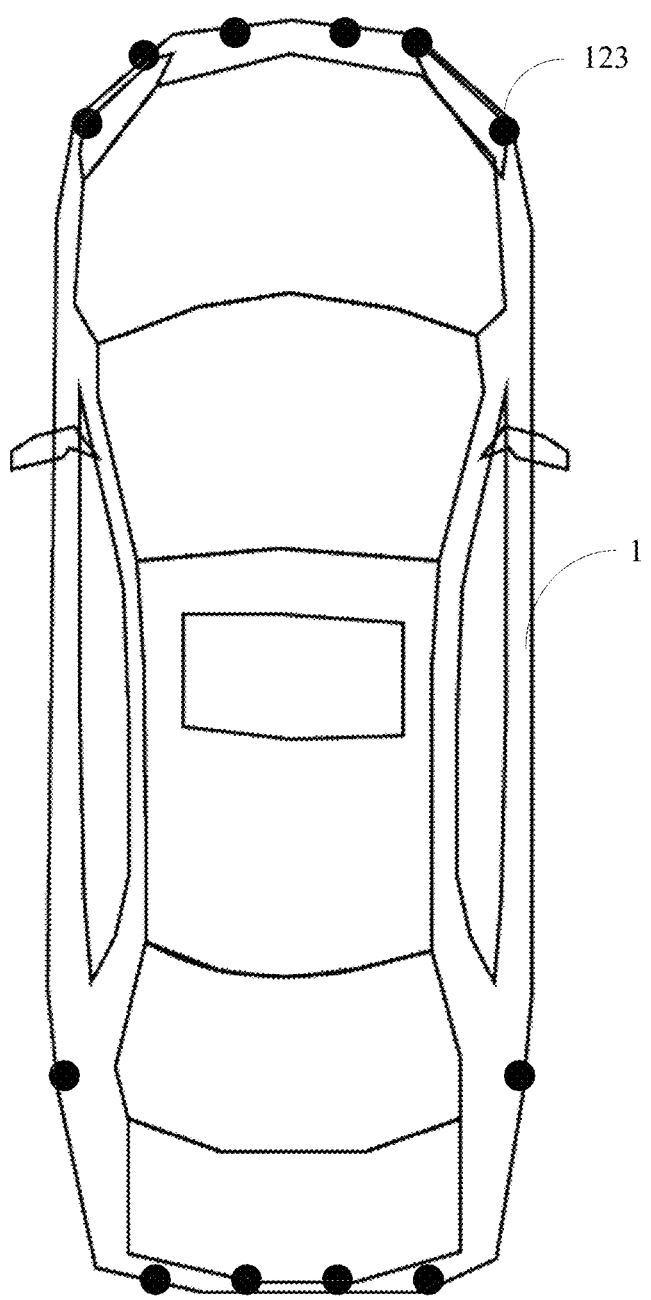
FIG. 11 is a schematic diagram of setting positions of a plurality of third radar devices in a vehicle on the vehicle according to an embodiment of this application.

Further, in an exemplary implementation of this application, as shown in FIG. 11, the environment perception device 12 (not shown in the figure, refer to FIG. 2) added to the vehicle 1 includes a plurality of third radar devices 123. The plurality of third radar devices 123 are disposed on the front anti-collision beam, the rear anti-collision beam, and a bodyside of the vehicle 1, and are connected to the intelligent driving control module 10 (not shown in the figure, refer to FIG. 2) in a wired manner (for example, through a Can cable, a Lin cable, an Ethernet cable, a coaxial cable, and a MOST bus) manner or in a wireless manner (for example, Wi-Fi and Bluetooth).

During a specific implementation, the plurality of third radar devices 123 may be implemented by using 12 ultrasonic radars, and the ultrasonic radars may be disposed on the vehicle body through installation holes, bolts, or other manners. It should be noted that, in this embodiment of this application, if the ultrasonic radars are disposed on the vehicle body through the installation holes, the bolts, or the other manners, corresponding installation structures are all reserved on relevant installation positions of the ultrasonic radars on the vehicle body.

Figure 12:
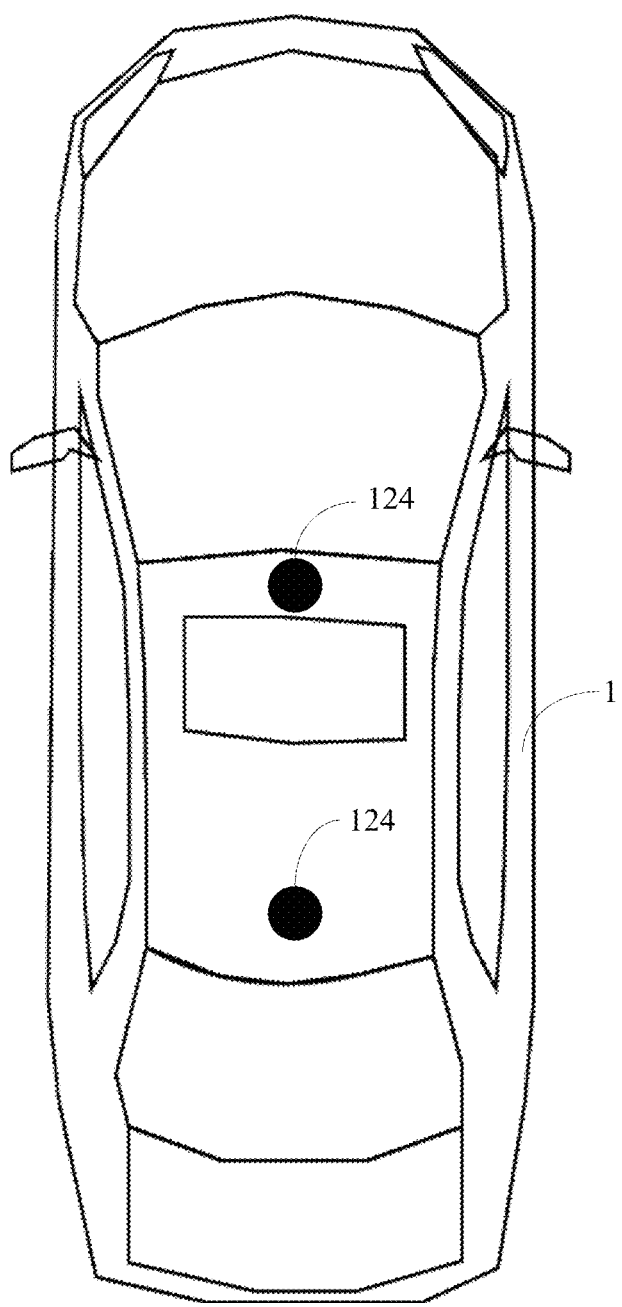
FIG. 12 is a schematic diagram of setting positions of a plurality of positioning antennas in a vehicle on the vehicle according to an embodiment of this application.

Further, in an exemplary implementation of this application, as shown in FIG. 12, the environment perception device 12 (not shown in the figure, refer to FIG. 2) added to the vehicle 1 includes a plurality of positioning antennas 124. The plurality of positioning antennas 124 are disposed on the top of the vehicle 1, and are connected to the intelligent driving control module 10 (not shown in the figure, refer to FIG. 2) in a wired manner (for example, through a Can cable, a Lin cable, an Ethernet cable, a coaxial cable, and a MOST bus) or in a wireless manner (for example, Wi-Fi and Bluetooth).

During a specific implementation, the plurality of positioning antennas 124 may be disposed on the vehicle body through installation holes, bolts, or other manners. It should be noted that, in this embodiment of this application, if the positioning antennas 124 are disposed on the vehicle body through the installation holes, the bolts, or the other manners, corresponding installation structures are all reserved on relevant installation positions of the positioning antennas 124 on the vehicle body.

In this embodiment of this application, as shown in FIG. 8 to FIG. 12, various sensor devices added to the vehicle are disposed on the vehicle by pre-setting the installation structures, so that the user does not need to perform modification on the vehicle when adding the sensors, which further improves the compatibility of the vehicle and is easy for the user to use.

In this application, by disposing an intelligent driving control module 10 on a vehicle, the intelligent driving control module 10 includes an open API which is a data interface for a third-party developer to perform secondary development, and the intelligent driving control module 10 is connected to the each system in the vehicle through a security gateway 11 of the vehicle, so that after the third-party developer performs secondary development on the vehicle by using the open API, the intelligent driving control module 10 obtains state data of the vehicle through the security gateway 11 and intelligently controls the vehicle according to the state data. Further, the vehicle provided in this application is provided with the open API, which helps a developer to perform secondary development on the vehicle without developing a bottom layer again in the development process.

The foregoing descriptions are merely exemplary embodiments of this application, but are not intended to limit this application. Any modification, equivalent replacement and improvement made within the spirit and principle of this application shall fall within the protection scope of this application.

What is claimed is:

1. A vehicle comprising:
   an intelligent driving control module connected to each system in the vehicle through a security gateway of the vehicle, the intelligent driving control module comprising an open application programming interface (API), and the open API is a data interface for a third-party developer to perform secondary development;
   an open signal interface connected to the intelligent driving control module and configured to connect an environment perception device to the intelligent driving control module to implement communication between the intelligent driving control module and the environment perception device, the environment perception device being operable to obtain an external environmental state of the vehicle and transmit the external environmental state of the vehicle to the intelligent driving control module; and an open power interface connected to a power battery of the vehicle configured to supply power to the environment perception device connected to the open signal interface;

wherein, when the third-party developer performs secondary development on the vehicle by using the open API, the intelligent driving control module obtains state data of the vehicle through the security gateway and intelligently controls at least one system of the vehicle according to the state data and the external environmental state of the vehicle.

2. The vehicle according to claim 1, further comprising an installation structure configured to install the environment perception device on the vehicle.

3. The vehicle according to claim 1, wherein the open signal interface comprises a multi-type interface module and a processing module, a data end of the multi-type interface module is connected to a data end of the processing module, the multi-type interface module is connected to a plurality of external devices with different types of interfaces, and the processing module obtains data collected by the external devices through the multi-type interface module and processes the data.

4. The vehicle according to claim 1, wherein the environment perception device comprises a plurality of image collectors, and the plurality of image collectors are respectively disposed on a front windshield, a left rear-view mirror, a right rear-view mirror, a top, a trunk lid, an inner wall of a passenger compartment, and a front grille of the vehicle.

5. The vehicle according to claim 1, wherein the environment perception device comprises a plurality of radar devices, and the plurality of radar devices are disposed on the front grille, a front anti-collision beam, and a rear anti-collision beam of the vehicle.

6. The vehicle according to claim 1, wherein the environment perception device comprises a plurality of radar devices, and the plurality of radar devices are disposed on the front grille and the top of the vehicle.

7. The vehicle according to claim 1, wherein the environment perception device comprises a plurality of radar devices, and the plurality of radar devices are disposed on the front anti-collision beam, the rear anti-collision beam, and a bodyside of the vehicle.

8. The vehicle according to claim 1, wherein the environment perception device comprises a plurality of positioning antennas, and the plurality of positioning antennas are disposed on the top of the vehicle.

9. The vehicle according to claim 1, wherein the intelligent driving control module is further connected to multimedia, a loudspeaker, and a dashboard on the vehicle.

10. The vehicle according to claim 1, wherein the open power interface comprises a 220 V power supply interface, a 24 V power supply interface, and a 12 V power supply interface, and the 220 V power supply interface, the 24 V power supply interface, and the 12 V power supply interface are all connected to the power battery on the vehicle.

11. The vehicle according to claim 1, wherein the environment perception device comprises a plurality of image collectors, and the plurality of image collectors are respectively disposed on a front windshield, a left rear-view mirror, a right rear-view mirror, a top, a trunk lid, an inner wall of a passenger compartment, and a front grille of the vehicle.

12. The vehicle according to claim 11, wherein the environment perception device comprises a plurality of first radar devices, and the plurality of first radar devices are disposed on the front grille, a front anti-collision beam, and a rear anti-collision beam of the vehicle.

13. The vehicle according to claim 12, wherein the environment perception device comprises a plurality of second radar devices, and the plurality of second radar devices are disposed on the front grille and the top of the vehicle.

14. The vehicle according to claim 13, wherein the environment perception device comprises a plurality of third radar devices, and the plurality of third radar devices are disposed on the front anti-collision beam, the rear anti-collision beam, and a bodyside of the vehicle.

15. The vehicle according to claim 14, wherein the environment perception device comprises a plurality of positioning antennas, and the plurality of positioning antennas are disposed on the top of the vehicle.

16. The vehicle according to claim 15, wherein the intelligent driving control module is further connected to multimedia, a loudspeaker, and a dashboard on the vehicle.

17. The vehicle according to claim 16, wherein the open power interface comprises a 220 V power supply interface, a 24 V power supply interface, and a 12 V power supply interface, and the 220 V power supply interface, the 24 V power supply interface, and the 12 V power supply interface are all connected to the power battery on the vehicle.

18. The vehicle according to claim 1, where the environment perception device comprises a plurality of millimeter wave radar devices.

19. The vehicle according to claim 1, wherein the environment perception device comprises a plurality of laser radar devices.

20. The vehicle according to claim 7, wherein the environment perception device comprises a plurality of ultrasonic radar devices.

* * * * *